US005722805A

United States Patent [19]

Giffin

[11] Patent Number: 5,722,805

[45] Date of Patent: Mar. 3, 1998

[54] DRILL BIT ADAPTOR TOOL

[76] Inventor: Brian K. Giffin, 92 Gold Trail, Goldhill, Boulder, Colo. 80302

[21] Appl. No.: 569,712

[22] Filed: Dec. 8, 1995

[51] Int. Cl.$^6$ .......... B32B 51/08

[52] U.S. Cl. .......... 408/239 R; 7/165; 279/102

[58] Field of Search .......... 408/238, 239 R, 408/240; 279/102, 143, 145; 7/165, 900

[56] References Cited

U.S. PATENT DOCUMENTS

| | | | |
|---|---|---|---|
| 87,715 | 3/1869 | Sible . | |
| 1,031,914 | 7/1912 | Clouse . | |
| 3,756,737 | 9/1973 | Smith | 408/239 |
| 3,932,904 | 1/1976 | Nilsson et al. | 7/165 |
| 4,413,937 | 11/1983 | Gutsche | 408/239 |
| 4,629,375 | 12/1986 | Lieser | 408/239 |
| 4,710,079 | 12/1987 | Smith et al. | 409/234 |

FOREIGN PATENT DOCUMENTS

| | | | |
|---|---|---|---|
| 1552404 | 12/1969 | Germany | 408/238 |

*Primary Examiner*—Daniel W. Howell
*Attorney, Agent, or Firm*—Sheridan Ross P.C.

[57] ABSTRACT

A drill bit adapter tool is provided having a lock member, sliding member, and spring that are slidably positioned on the tool body. The lock member engages the driver of a drill and thereby holds the adapter tool to the drill. The lock member is disengaged to permit removal of the adapter tool from the driver by moving the sliding member, lock member, and spring relative to the tool body. The adapter tool facilitates convenient and rapid replacement of drill bits or other working pieces.

15 Claims, 8 Drawing Sheets

44
96
84
76
72
212
208
216
60
200
204
224
220
222

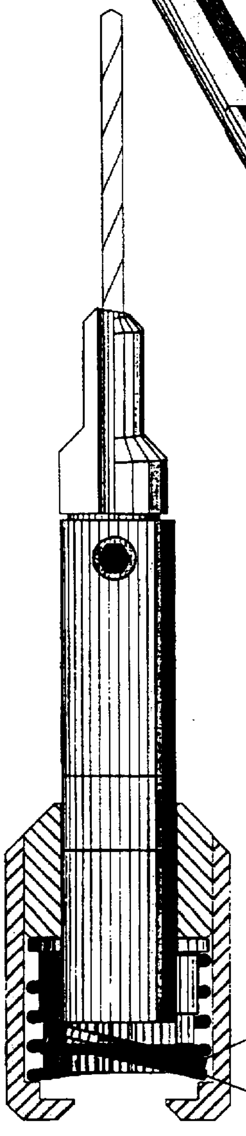
Fig. 20
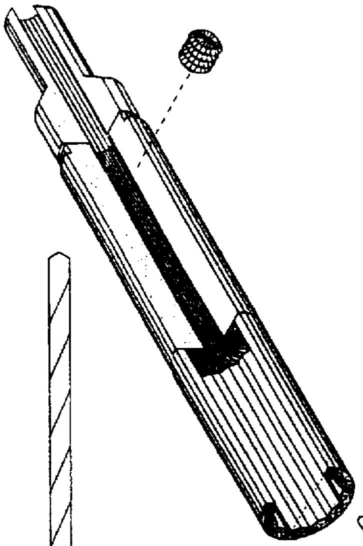
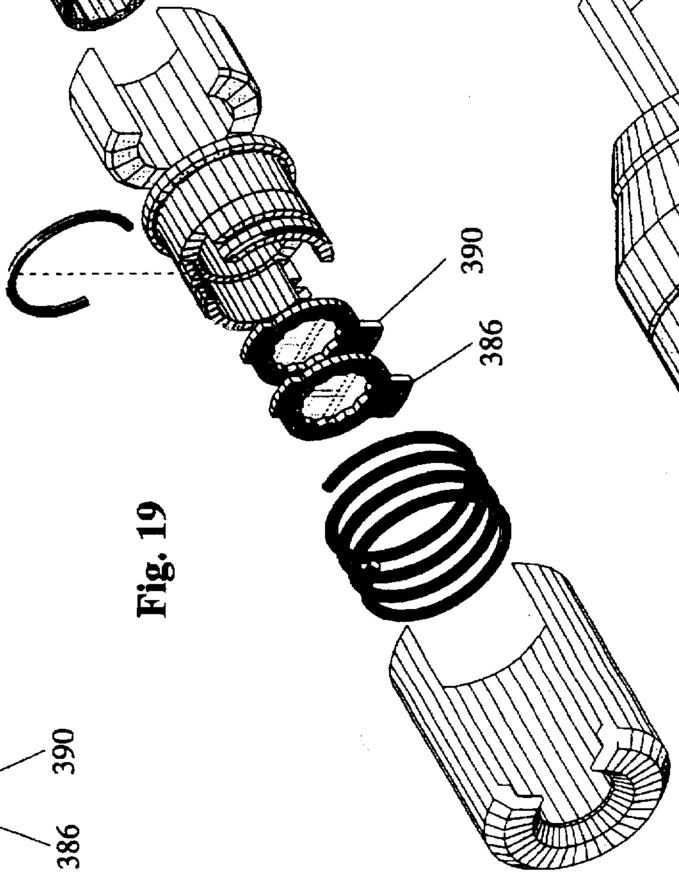
Fig. 19
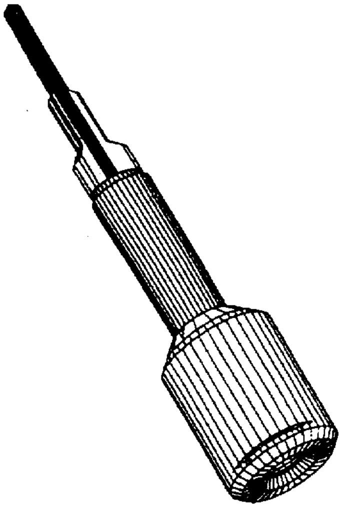
Fig. 21
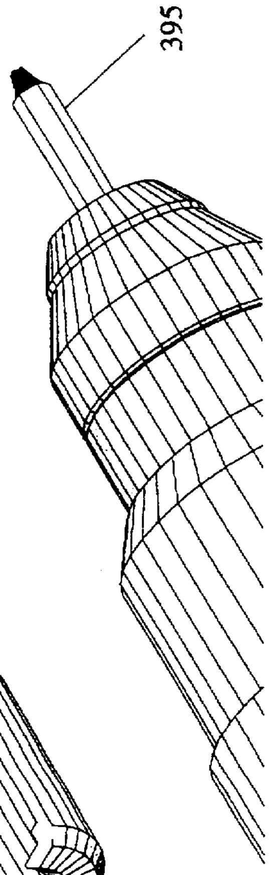

DRILL BIT ADAPTOR TOOL

FIELD OF THE INVENTION

The present invention is generally directed to hand tools and more specifically to devices for mounting a drill bit on a hand tool that rotates or drives the drill bit.

BACKGROUND OF THE INVENTION

In many trades and other work situations, an operator must repeatedly exchange drill bits or replace drill bits with other tools, such as a driver or screw driver tip, while performing successive, repetitive operations using the electric drill. For example, construction workers or carpenters regularly change drill bits during numerous types of construction projects, often times when the worker is in a position where it is difficult to change the drill bit, such as on a ladder. To change a drill bit, the carpenter must loosen the chuck, remove the old bit from the chuck, insert the new bit and tighten the chuck. Drill bit changes typically require both hands, which can interrupt the carpenter's work, resulting in inconvenience and thereby increased costs due to the inefficient use of time required by the changing of drill bits. Tool changes are especially a problem when the carpenter is temporarily holding an object in place with one hand while attempting to switch drill bits with the other. An expensive alternative is to use multiple drills having different drill bits or tools attached to each.

Several devices have been developed to attempt to simplify the process for exchanging drill bits or replacing drill bits with other tools, such as a driver or screw driver tip. In one device, for example, the multiple prongs of an adaptor are inserted into the cavities in the drill chuck. Although the device does provide a simpler method for exchanging tools, the prongs can be difficult to align with the cavities. Through wear, the ability of the prongs to grip the chuck can decrease over time. As a result, the adaptor can wobble on the chuck during use and get stuck in the drilled hole during removal.

Another device for exchanging tools includes an adaptor having a drill bit at one end and a driver at the other end. A holder receives a selected one of each of these two ends. During the drilling operation, the drill bit is exposed and the driver is within the holder. After drilling and when it is desired to then utilize the driver, this adaptor is grasped and removed from the holder. The drill bit end is then inserted into the holder. However, such an adaptor is subject to heat build-up during such usage. This heat can cause discomfort or burn the operator's fingers upon reversing the ends of the adaptor. Additionally, such heat build-up can cause the adaptor to expand and become jammed in the holder. This is especially a problem when sawdust and other debris collects in the holder from the drill bit when it is placed in the holder. Furthermore, when the drill bit breaks off from the adaptor, unwanted complications occur in replacing the broken drill bit with a new drill bit.

Other prior art devices for exchanging tools include drill bits that have similar or the same drawbacks, particularly when performing back-and-forth drill and drive operations. That is, operations that involve alternating and repeated uses of the drill bit and the driver. For example, alternating the drilling of a hole using a drill bit and performing a fastening or other operation using a driver.

SUMMARY OF THE INVENTION

It is an objective of the present invention to provide a drill adaptor tool that can be conveniently and rapidly engaged with a drill and chuck in order to facilitate the back-and-forth drill and drive operations. Related objectives include providing a low cost, less complex drill adaptor tool, a drill adaptor tool that will not dislodge from the drill or chuck or become jammed in the drill or chuck during use, and a drill adaptor tool that will not become difficult to handle due to heat buildup during use.

Another objective is to create a tool system in which different tools are mounted on a number of interchangeable drill adaptor tools for rapid tool changes.

This and other objectives are addressed by the adaptor tool of the present invention. The adaptor tool includes: (i) a tool body; (ii) a working piece, such as a drill bit, connected to the tool body; (iii) a lock member for locking the tool body to a driver engaging the drill; (iv) a sliding member that is moveable relative to the tool body to cause the lock member to move to permit the unlocking of the driver; and (v) a spring for engaging at least one of the sliding member and lock member to cause the sliding member to return to a locked position of the lock member when released by a user and cause the adaptor tool to be held on the driver.

To facilitate changes of tools from the drill and thereby the alternating drill and drive operations, the sliding member in one embodiment of the present invention is positioned to facilitate grasping and moving thereof by the user. The user can easily use the same hand to move the sliding member to unlock the driver and remove the adaptor tool from the driver in a single continuous operation. The lock member locks firmly to the driver and prevents the adaptor tool from dislodging from the driver during use. Accordingly, the user does not have to remove a tool or driver from the drill chuck but can simply slide the adaptor tool onto the driver and, when completed, slide the adaptor tool off. As part of the drill and drive operations, the adaptor tool enables a user to rapidly drill a number of holes and insert screws in the holes. The user first uses the adaptor tool to drill one or more holes and then removes the adaptor tool and uses the driver to insert screws in the holes.

The lock member and tool body have passages that engage the driver. The passages preferably have substantially the same shape as the driver to facilitate proper connection between the adaptor tool and the driver. When this is achieved, appropriate parts of the adaptor tool are driven or rotated using the driver without complications including undue wear of adaptor tool parts.

To permit the sliding member to move the lock member to an unlocked position, the back face of the sliding member (i.e., the face adjacent to the driver) engages one or both of the spring and lock member during movement of the sliding member. In one configuration, the lock member is positioned between the back face and the tool body to engage the driver.

To facilitate movement of the sliding member, the sliding member can include a bushing member located inwardly of the cap member. The bushing member has a diameter smaller than the cap member to engage the cap member. The bushing member facilitates movement of the sliding member by transferring the thrust from the sliding member to the bushing member.

The spring preferably has a sufficient strength to return the sliding member to a locked position, even if opposed by the combined weight of the sliding member and lock member. Preferably, the spring has a force constant of about 0.75 lbs./sq. in.

In another embodiment, the adaptor tool includes a device, located on at least one of the tool body and sliding member, for restraining movement of the lock member. The device thereby permits alignment of the lock member passage with the tool body passage and rotation of the tool body by the driver when the lock member alone engages the driver. This feature facilitates tool changes by permitting the adaptor tool to be pushed easily onto the driver. The operator using the adaptor tool need only employ a slight twist of the adaptor tool when it is not aligned in order to align the driver with the lock member and the tool body passage. The lock member is also capable of transferring rotation from the driver to the tool body, even if the tool body passage fails to engage the driver. In this manner, the restraining device provides a fail safe solution to overcome operator error.

The restraining device can be in a variety of configurations. In one configuration, the device includes a slot on a collar member and a projection on the lock member that is received in the slot. In another configuration, the device includes a projection on the collar member that is received in a slot on the lock member.

In another embodiment, the back face of the lock member is located (at the shortest distance) at a distance of no more than about 0.50 inch from the back face of the cap member. This permits the lock member to engage a driver that is not long enough to engage the tool body passage. If a standard driver is inserted all the way to the back of the chuck, the protruding portion of the chuck will generally be no more than about 1.00 inch. The lock member can thus engage the driver and transfer rotation from the driver to the tool body even if the driver fails to engage the tool body passage.

To reduce the likelihood that the driver will fail to contact the tool body passage, the opening of the tool body passage can be located no more than about 0.75 inch from the back face of the cap member.

To provide a bearing surface for the driver and thereby permit a user to apply a force to the drill during operation, the bottom of the tool body passage can be located an appropriate distance from the back face of the cap member to engage the tip of the driver. The bottom is preferably located at a distance of no more than about 1.0 inch from the back face.

As is evident from the foregoing, the adaptor tool of the present invention enables the operator to rapidly perform repeated alternating drill and drive operations. This will greatly facilitate tool changes and decrease the manhours required to perform various tasks.

BRIEF DESCRIPTION OF THE DRAWINGS

FIG. 19 illustrates an adaptor tool having a number of lock members;

FIG. 20 is a side elevational view, partly in cross-section, of the embodiment of FIG. 19;

FIG. 21 illustrates an exploded, perspective view of the embodiment of FIG. 19 in which the tool is aligned with the driver to which it is to be connected.

DETAILED DESCRIPTION

Figures 1, 2, 3:
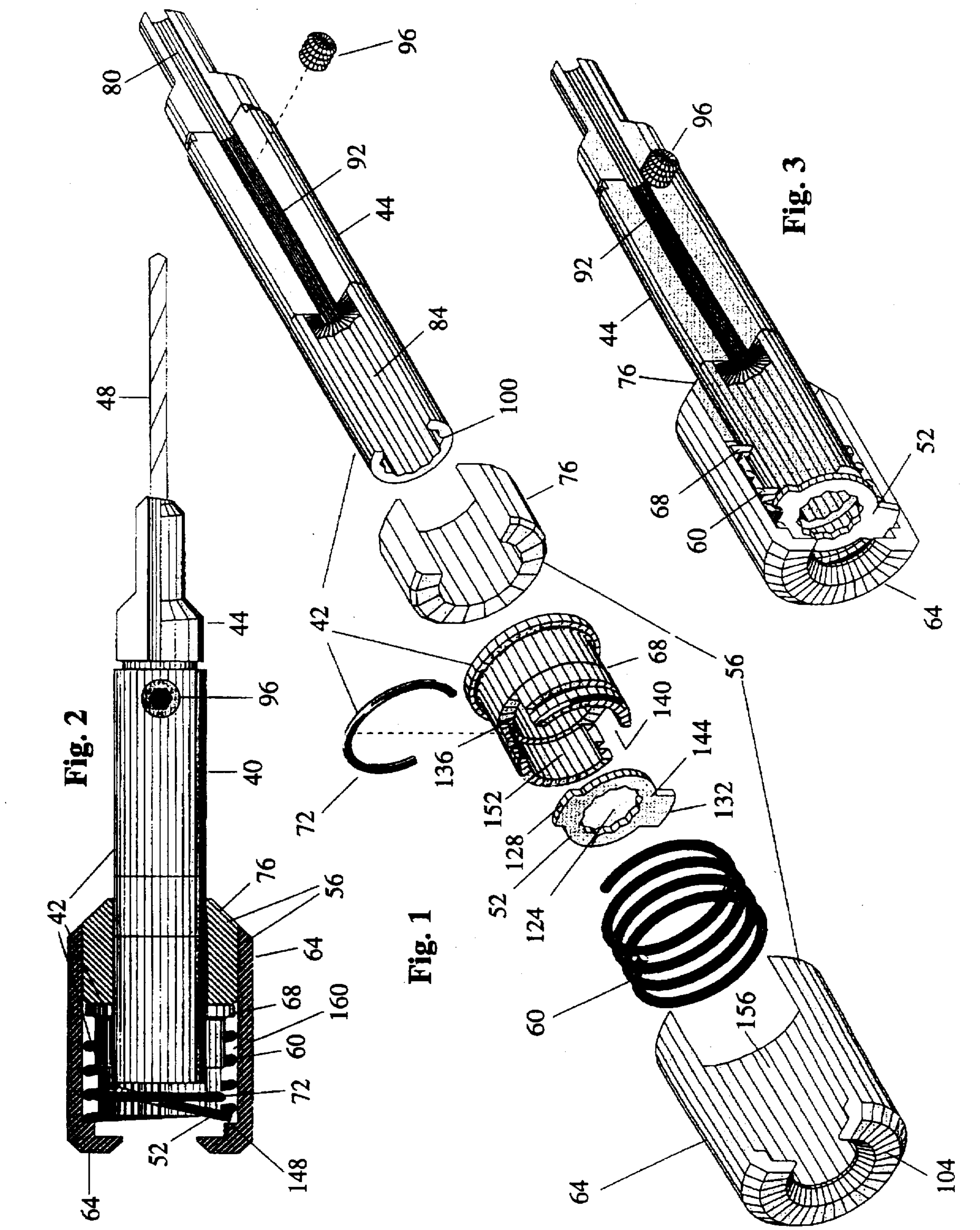
FIG. 1 is a disassembled view of a drill bit adaptor tool according to a first embodiment of the present invention.
FIG. 2 is a side elevational view of the drill bit adaptor tool of FIG. 1.
FIG. 3 is a longitudinal cross-sectional view of the drill bit adaptor tool of FIG. 1.
Figure 4:
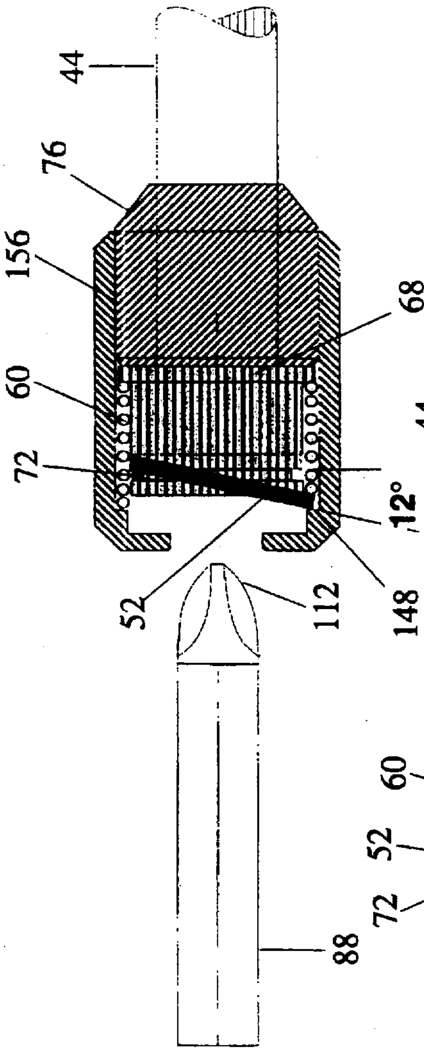
FIG. 4 is a side elevational view of portions of the drill bit adaptor tool of FIG. 1 in cross-section illustrating the driver being prepared for connection to the tool.
Figure 5:
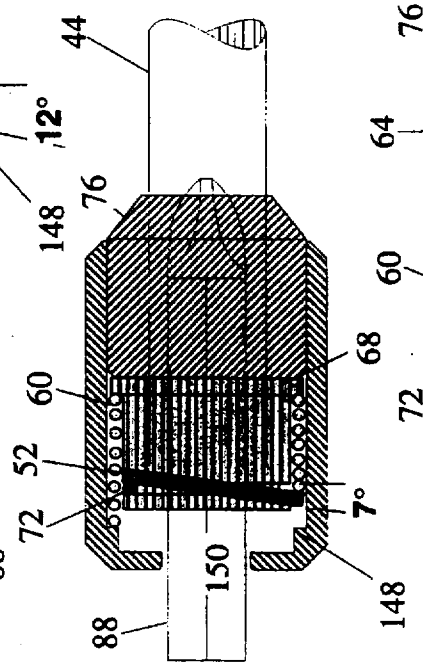
FIG. 5 is a side elevational view, similar to FIG. 4, but showing the driver connected to the drill bit adaptor tool.
Figure 6:
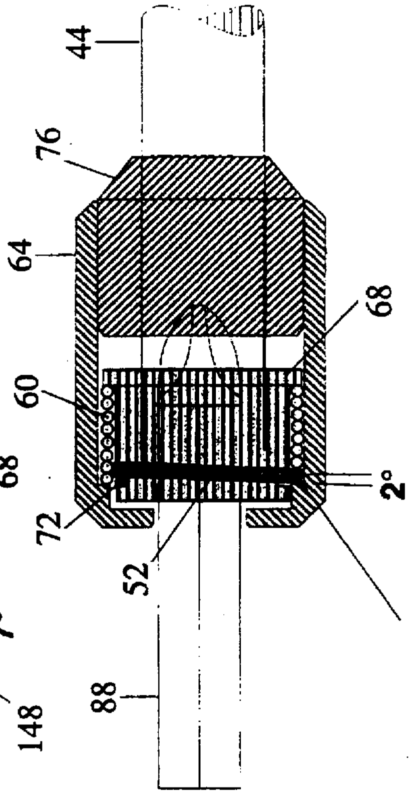
FIG. 6 is a side elevational view, similar to FIG. 5, but showing movement of the driver in the opposite direction for disconnection from the drill bit adaptor tool.

FIGS. 1–3 depict a drill bit adaptor tool 40 according to a first embodiment of the present invention. The drill bit adaptor tool includes a tool body assembly 42 to receive a drill bit 48, a lock member 52, a sliding member assembly 56, and a spring 60. The sliding member assembly 56 further includes cap member 64 and a bushing member 76. The tool body assembly 42 further includes a tool body 44, a collar member 68 and a snap ring 72. As will be appreciated, the present invention can be used for any tool bit that is attached to a tool that rotates, such as a drill, braces, drill presses and electric drills.

Referring to FIGS. 1–6, the tool body 44 is a cylindrical member having a front passage 80 to receive the drill bit, a back passage 84 to receive a driver 88 of the drill (not shown), and a central passage 92 connecting the other two passages. A set screw 96 can be included to hold the drill bit firmly in position in the front passage 80.

To permit the driver 88 to rotate the tool body 44, the back passage 84 is sized and shaped such that it contacts and interlocks with the driver exterior. Generally, the back passage 84 will have a shape similar to that of the driver exterior. By way of example, for angular shaped drivers, the back passage 84 can have an angular shape, and for hexagonal shaped drivers, the back passage can have a hexagonal shape, such as a twelve-sided configuration. A rounded back passage fails to permit the driver 88 to rotate the tool body 44 because of the lack of an interlocking surface in the passage.

To permit relatively short drivers to engage the back passage 84, the back face 100 of the tool body 44 is preferably located at a distance of no more than about 0.50, and most preferably no more than about 0.25 inch from the back face 104 of the cap member 64. The cap member's back face 104 is the surface of the drill bit adaptor tool that contacts the drill chuck. The chuck holds the driver in position. The distance from the cap member's back face 104 to the bottom 108 of the back passage 84 is preferably sufficient for the driver tip 112 to contact the bottom 108.

The lock member 52 locks the tool body 44 to the driver 88 and thereby prevents the drill bit adaptor tool from becoming dislodged from the driver during use and aligns the driver 88 with the back passage 84 of the tool body 44. An inner passage 124 of the lock member 52 is sized and shaped such that it contacts and interlocks with the driver exterior. Generally, the inner passage 124 will have the same shape as the back passage 84 and a shape similar to that of the driver exterior. By way of example, for angular shaped drivers, the inner passage 124 can have an angular shape and for hexagonal shaped drivers, the inner passage 124 can have a hexagonal shape. A rounded inner passage 124 would fail to align the driver 88 with the back passage 84 of the tool body 44 and would fail to cause the driver 88 to rotate the tool body 44 if the driver 88 did not engage the back passage 84.

The lock member 52 includes an upper flange 128 and a lower flange 132 which are received by upper slot 136 and lower slot 140 in the collar member 68 of the sliding member assembly 56 to restrain the rotational movement of the lock member 52 relative to the tool body 44. This permits not only the inner passage 124 of the lock member 52 to be aligned with the back passage 84 of the tool body 44 to facilitate insertion of the driver 88 therein but also the lock member 52 is useful in permitting the tool body 44 to rotate if the driver is too short to engage a portion of the back passage 84. To permit the lock member 52 to engage shorter drivers 88, the back surface 144 of the lock member 52 is preferably located (at its shortest distance) at a distance of no more than about 0.50, more preferably no more than about 0.25, and most preferably no more than about 0.125 inch, from the back face 104 of the cap member 64 when the lock member 52 is in its locked position. The lock member preferably has a thickness ranging from about 0.02 to about 0.10 inch, with 0.03 inch being the optimal thickness.

The lock member 52 locks against the driver 88 when the angle $\theta$ between the plane of the lock member 52 and the longitudinal axis of the driver 88 is acute and unlocks the driver 88 when the angle $\theta$ is substantially normal. $\theta$ preferably ranges from about 75° to about 90° and more preferably from about 85° to about 90°.

The sliding member assembly 56 slides along the tool body 44 to permit the lock member 52 to lock or unlock the driver 88. At the "at rest" position of the sliding member assembly 56, the lock member 52 locks against the driver 88. In this position, it is important that there be a gap between an inner lip 148 of the cap member 64 and the edge 150 of the lock member 52 so that no unwanted pressure is applied to the lock member 52 that would impede its locking function. From this position, the sliding member assembly 56 is moved to unlock the lock member 52 from the driver 88.

To provide a fixed point for movement of the lock member 52 in response to movement of the sliding member assembly 56, the collar member 68 is stationary relative to the sliding member assembly 56. The collar member 68 is pressure fitted to the tool body 44. In this manner, the sliding member assembly 56 moves independently of the collar member 68.

To permit the unlocking of the lock member 52 from the driver 88, the snap ring 72 engages the upper flange 128 of the lock member 52 to form a pivot point for the lock member 52. The lock member 52 rotates about the pivot point to an unlocked position as the sliding member assembly 56 is moved towards the tool body 44. The inner lip 148 of the cap member 64 engages the lower flange 132 of the lock member 52 to move the lock member 52 as the sliding member assembly 56 is moved. The snap ring 72 engages the lock member 52 during movement of the sliding member assembly 56 and causes the lock member 52 to move to a position that is substantially normal to the tool body's longitudinal axis. In this lock member position, the driver 88 moves freely throughout the inner passage 124.

To permit free movement of the sliding member assembly 56 and lock member 52, the relative sizes of various components are important. The inner diameter of the bushing 76 is larger than the outer diameter of the tool body 44 and the outer diameter of the lock member 52 is less than the inner diameter of the sleeve 152 of the collar member 68 (to permit the lock member 52 to rotate about the pivot point inside of the sleeve 152). In addition, the collar member 68 includes the upper and lower slots 136, 140 to receive the upper and lower flanges 128, 132. The snap ring 72 is received by the back portion of the collar member 68 to restrain upper flange movement. The open end of the snap ring 72 permits the lower flange 132 and lock member 52 to move freely inside of the sleeve 152.

To assemble the components of the sliding member assembly 56, the sleeve 152 of the collar member 68 is received inside of the bore 156 of the cap member 64 and is held in position by the tool body 44. In one embodiment, the bushing 76 is pressure fitted to the interior of the cap member 64. In another embodiment, a crimp-like or other suitable connection is utilized. The outer diameter of the sleeve 152 is less than the inner diameter of the bore 156 to permit assembly of the various parts. The location of the cap member 64 on the exterior of the drill bit adaptor tool facilitates grasping and moving of the sliding member assembly by a user regardless of the lock member's position.

The spring 60 engages the sliding member assembly 56 such that the spring 60 opposes movement of the sliding member assembly 56 and thereby causes the sliding member assembly 56 to return to its original ("at rest") position after the sliding member assembly 56 is released by the user. In this at rest position of the sliding member assembly 56, the lock member 52 is in the locked position. The spring 60 has an inner diameter larger than the outer diameter of the sleeve 152 but smaller than the inner diameter of the bore 156 to permit the spring 60 to be located in the channel 160 between the cap member 64 and the collar member 68. The inner lip 148 of the cap member 64 engages the spring 60 to permit the spring 60 to return the sliding member assembly 56 to the locked position.

The spring 60 preferably has a sufficient tension to move each of the sliding member assembly 56 and the lock member 52 to its locked position. It is important that the spring 60 have sufficient strength to move the sliding member assembly 56 to its original position, even if the weight of the sliding member assembly 56 opposes the assembly 60. The force constant of the spring 60 preferably is about 0.75 lbs./sq. in. Movement of the sliding member assembly 56 against the force of the spring 60 moves each of the sliding member assembly 56 and the lock member 52 to its unlocked position.

In operation, a driver 88 is placed in the drill chuck and the chuck tightened. The driver 88 preferably extends no less than about 1 inch from the face of the chuck to permit the driver 88 to engage the drill bit adaptor tool 40. The driver 88 is roughly aligned with the inner passage 124 of the lock member 52 and pushed towards the front of the adaptor tool. As the operator engages the adaptor tool with the driver, the adaptor tool operator typically will slightly twist the adaptor tool 40 in order to align the driver 88 with the lock member inner passage 124. The driver 88 is then passed through the inner passage 124 of the lock member 52 and into the back passage 84 of the tool body 44. The sliding member assembly 56 is then released by the user. The sliding member assembly is returned to its original (locked) position by the spring 60. In this position, the inclined lock member 52 firmly grips the driver 88 and prevents disengagement of the driver 88 from the adaptor tool during use. As the driver 88 is rotated, the driver will rotate the tool body and therefore the drill bit.

To remove the adaptor tool after use, the sliding member assembly 56 is moved by the user in the direction of the unlocked position. The sliding member assembly 56 and back face 100 of the tool body 44 together cause the lock member to pivot about the snap ring 72 to an upright and unlocked position. As the sliding member assembly 56 reaches its unlocked position, the adaptor tool is removed from the driver 88 as part of a single, continuous removal operation.

Figures 7, 8, 9:
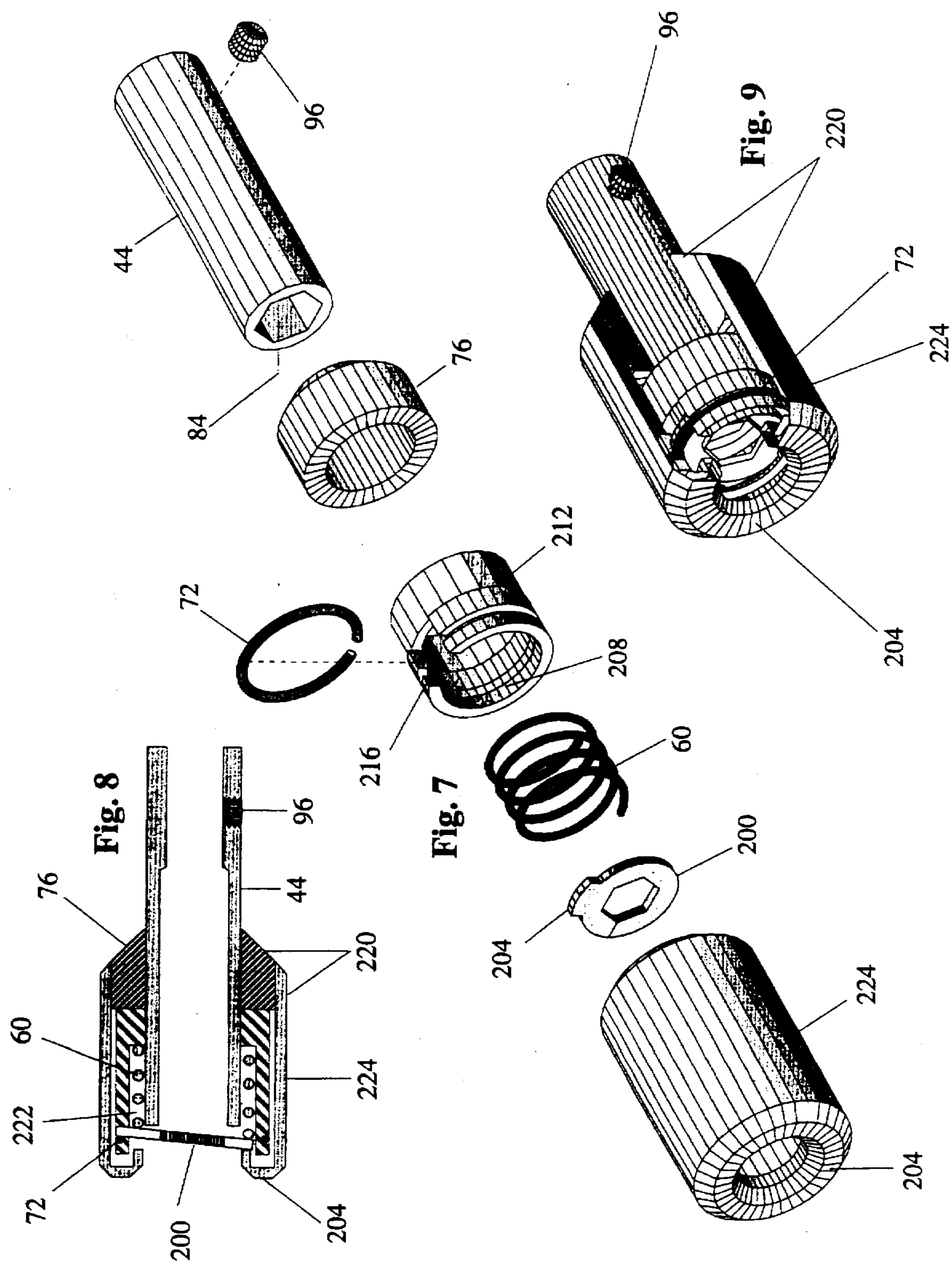
FIG. 7 is a disassembled view of a drill bit adaptor tool according to a second embodiment of the present invention.
FIG. 8 illustrates a longitudinal cross-sectional view of a second embodiment of a drill bit adaptor tool.
FIG. 9 is an enlarged, perspective view of the drill bit adaptor tool of the second embodiment with portions thereof being cut-away.

The drill bit adaptor tool can be made in a variety of other embodiments. By way of example, FIGS. 7–9 depict a second embodiment of the present invention in which the lock member 200 has only one flange 204 and the spring 60 is located inside of the sleeve 208. To accommodate the lock member 200, the collar 212 has a single slot 216. The sleeve 208 forms a channel 222 with the tool body 44 to receive the spring 60. When the sliding member assembly 220 is released, the spring 60 forces the lock member 200 towards the back face 204 of the cap member 224. The lock member 200 engages the cap member 224 and forces the sliding member assembly 220 into its original (locked) position.

Figures 10, 11, 12:
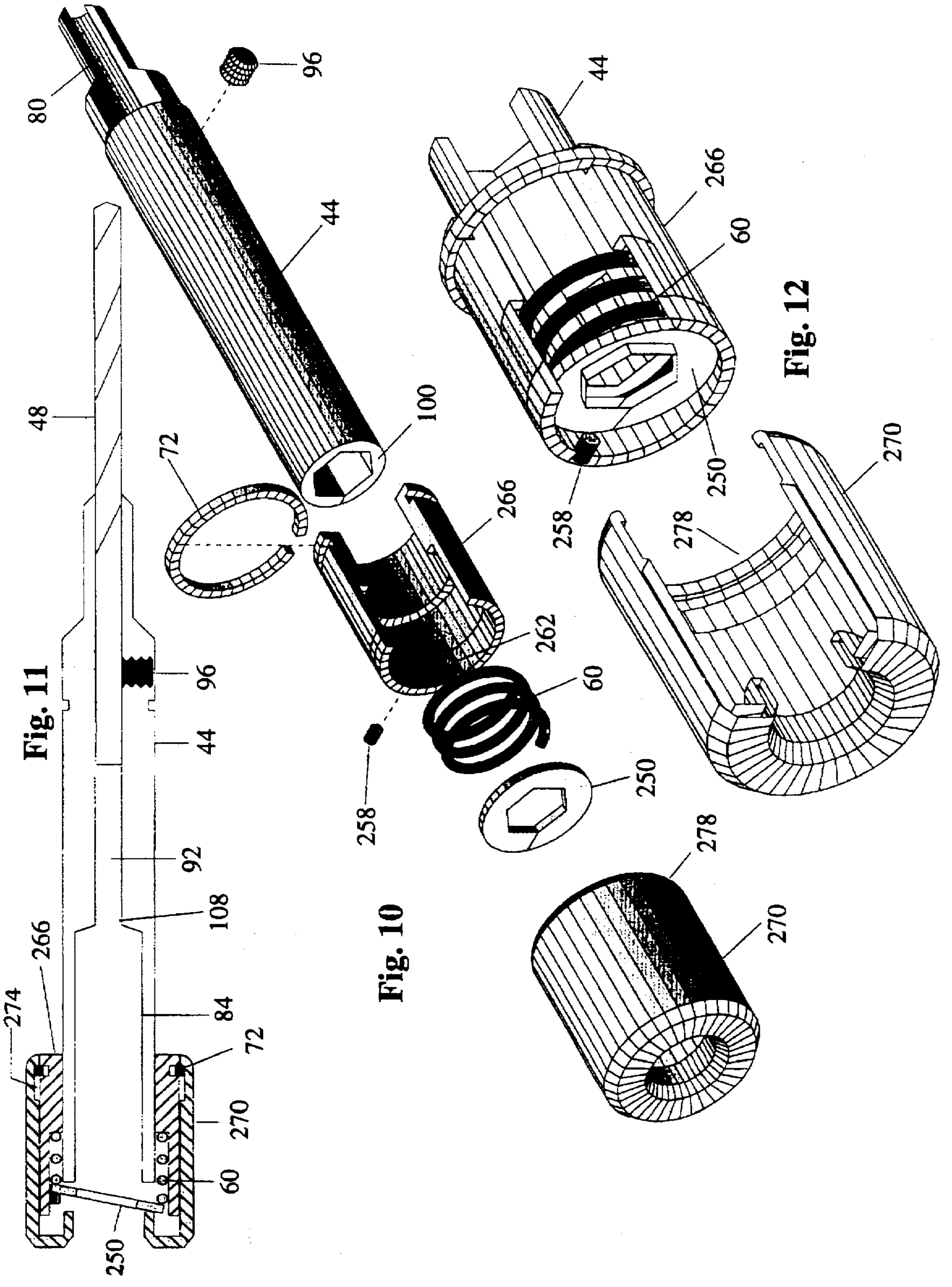
FIG. 10 is a disassembled view of a drill bit adaptor tool according to a third embodiment of the present invention.
FIG. 11 is a longitudinal cross-sectional view of a third embodiment of the drill bit adaptor tool together with a drill bit held by the tool.
FIG. 12 is an enlarged, exploded view of the third embodiment with portions thereof cut-away.

FIGS. 10–12 depict a third embodiment of the present invention which differs from the second embodiment in that the lock member 250 is without flanges and the sliding member assembly is without a bushing member and consists of only the cap member 270. A projection 258 is inserted through the sleeve 262 of the collar member 266 to act as the pivot point for the lock member 250. The absence of flanges permits the sleeve to be without any slots to receive the flanges. As noted above, the cap member 270 is able to move relative to the collar member 266. The snap ring 72 is located in a groove 274 in the cap member 270 near the cap member's front face 278. As the cap member 270 is moved by a user, the snap ring 72 moves in the groove 274. The snap ring 72 permits the lock member 250 and spring 60 to return the cap member 270 to the original (locked) position.

Figures 13, 14, 15:
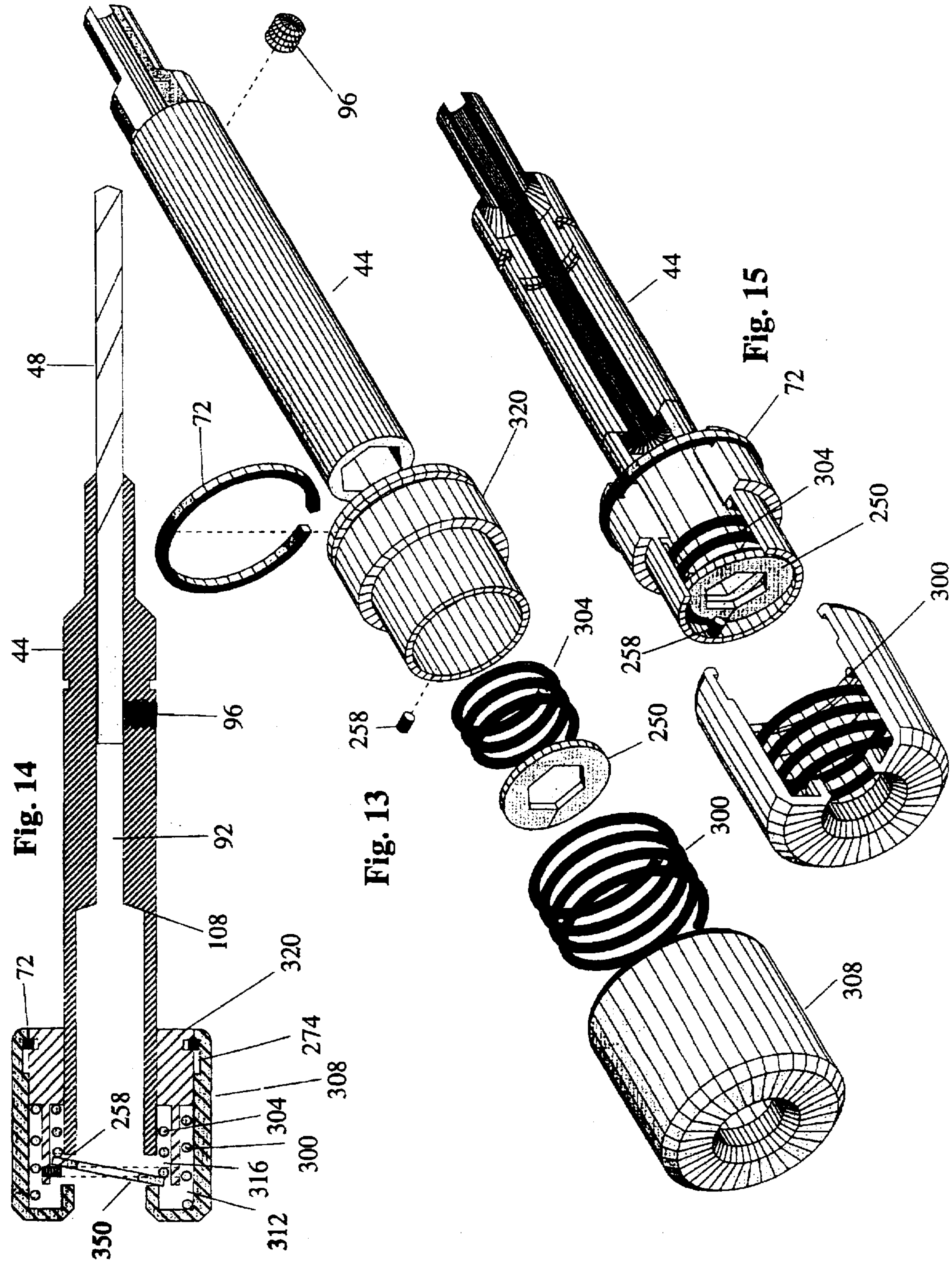
FIG. 13 is a disassembled view of a drill bit adaptor tool according to a fourth embodiment of the present invention.
FIG. 14 is a longitudinal cross-sectional view of the drill bit adaptor tool of a fourth embodiment together with a drill bit.
FIG. 15 is an exploded view of the fourth embodiment of the drill bit adaptor tool with portions thereof cut-away.

FIGS. 13–15 depict a fourth embodiment of the present invention which differs from the third embodiment in that inner and outer springs are employed. The outer spring 300 is used with the inner spring 304 to further enhance the ability of the cap member 308 to return to the original (locked) position after it is released by a user. The inner and outer springs 300, 304 are housed in inner and outer bevelled channels 312, 316 of the collar 320.

Figures 16, 17, 18:
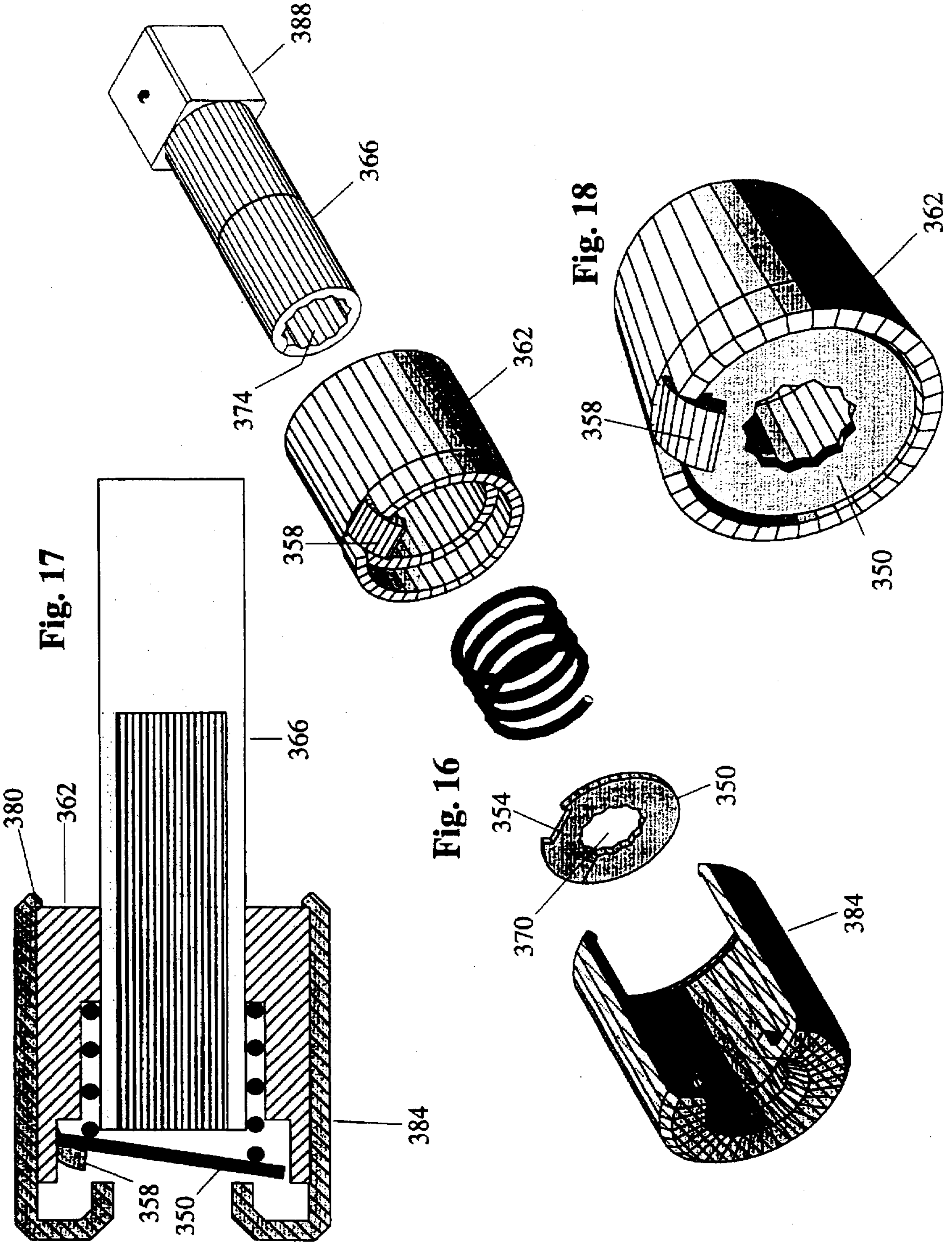
FIG. 16 is a disassembled view of a drill bit adaptor tool according to a fifth embodiment of the present invention.
FIG. 17 is a longitudinal cross-sectional view of a fifth embodiment of the drill bit adaptor tool.
FIG. 18 illustrates a perspective view of portions of the drill bit adaptor tool of the fifth embodiment.

FIGS. 16–18 depict a fifth embodiment of the present invention which differs from the first embodiment in that the lock member 350 includes a slot 354, rather than flanges that interacts with a bent tab 358 in the collar member 362 to form the lock member pivot point. The bent tab 358 is received by the slot to prevent the lock member 350 from rotating independently of the tool body 366 and align the inner passage 370 of the lock member 350 with the back passage 374 of the tool body 366. The front face 380 of the cap member 384 is compressed inwardly to retain cap member 384 on the collar 362.

This embodiment further illustrates that the adaptor tool is not limited to drill bits. The tool body 366 can include a rectangular head 388 to be received by a socket. As will be appreciated, such sockets are used to tighten or loosen bolts or nuts.

In a sixth embodiment of the present invention shown in FIGS. 19–21, the adaptor tool includes a plurality of lock members 386, 390. The lock members are located adjacent to one another, with the adjacent, planar surfaces of the lock members being substantially parallel. The use of multiple lock members is intended to improve the locking between such lock members and the driver 395 of the tool body 44 and provide increased strength for rotation of the adaptor tool by the driver 395 when the driver fails to engage the back passage 84.

Figure 22:
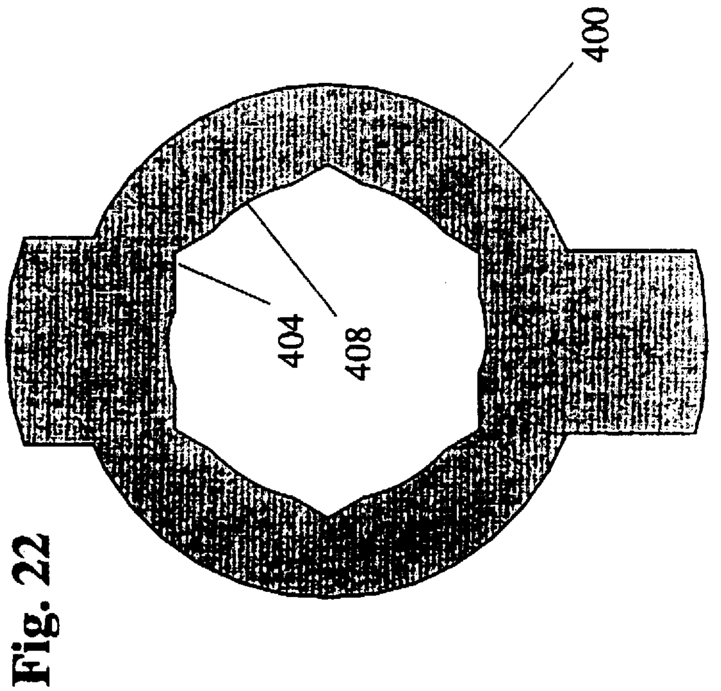
FIG. 22 depicts a lock member having a different inner passage shape to enhance engagement with the driver.

Lastly, with reference to FIG. 22, another lock member 400 is illustrated and characterized by its differently configured inner passage 404. The inner passage 404 reduces the area of contact between the lock member 400 and the driver. Such a reduced amount of contact area between the lock member 400 and the driver results in increased friction so that unwanted unlocking of the lock member 400 is eliminated or at least substantially reduced. With regard to this design for reduced engagement between the inner passage 404 and the driver, the contact area of the inner passage 404 with the driver should be about 25% to 75% of the total available or potential contact area of the inner passage 404.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. An adaptor tool for connection to a driver, comprising:

a tool body having a longitudinal axis;

a working piece connected to said tool body;

a lock member for locking said tool body to the driver, with said lock member being in a first position relative to said longitudinal axis of said tool body;

a sliding member that is moveable relative to said longitudinal axis of said tool body to cause said lock member to move to a second position in order to permit the unlocking of the driver, said sliding member being positioned to facilitate grasping and moving thereof by a user of the adaptor tool wherein, in one of said first and second positions, said lock member is inclined relative to said longitudinal axis of said tool body and, in the other of said first and second positions, said lock member is less inclined relative to said longitudinal axis of said tool body than when said lock member is in said one of said first and said second positions; and a spring for engaging at least one of said sliding member, said tool body, and said lock member, wherein said spring permits the locking of said lock member when said sliding member is released by the user.

2. An adaptor tool for connection to a driver, comprising:

a tool body;

a working piece connected to said tool body;

a lock member for locking said tool body, said lock member having a passage extending therethrough to receive the driver, the driver having an angular shape and said passage having substantially the shape of the driver;

a sliding member that is movable relative to said tool body to cause said lock member to move to permit the unlocking of the driver, said sliding member being positioned to facilitate grasping and moving thereof by a user of the adapter tool; and a spring for engaging at least one of said sliding member, said tool body, and said lock member, wherein said spring permits the locking of said lock member when said sliding member is released by the user.

3. A tool, as claimed in claim 2, wherein:

said shape is hexagonal.

4. A tool, as claimed in claim 2, wherein:

said tool body includes a driver passage for receiving said driver and said lock member engages means for restraining movement of said lock member, whereby said restraining means aligns said lock member passage with said driver passage.

5. A tool, as claimed in claim 4, wherein:

said restraining means includes a slot on one of said tool body and sliding member and a projection on said lock member that is received in said slot.

6. A tool, as claimed in claim 1, wherein:

said spring surrounds a portion of said tool body and is located between said tool body and said sliding member.

7. An adaptor tool for connection to a driver, comprising:

a tool body;

a working piece connected to said tool body;

a lock member for locking said tool body to the driver;

a sliding member that is movable relative to said tool body to cause said lock member to move to permit the unlocking of the driver, said sliding member being positioned to facilitate grasping and moving thereof by a user of the adaptor tool, said sliding member having a front face and a back face, with said front face being relatively more adjacent to said tool body than said back face, said lock member being located at a distance of no more than about 0.50 inch from said back face to engage the driver; and a spring for engaging at least one of said sliding member, said tool body, and said lock member, wherein said spring permits the locking of said lock member when said sliding member is released by the user.

8. An adaptor tool for connection to a driver, comprising:

a tool body;

a working piece connected to said tool body;

a lock member for locking said tool body to the driver;

a sliding member that is movable relative to said tool body to cause said lock member to move to permit the unlocking of the driver, said sliding member being positioned to facilitate grasping and moving thereof by a user of the adaptor tool; and a spring for engaging at least one of said sliding member, said tool body, and said lock member, wherein said spring permits the locking of said lock member when said sliding member is released by the user;

wherein said sliding member having a front face and a back face, with said front face being relatively more adjacent to said tool body than said back face and in which said back face engages one of said spring and said lock member when said lock member is moved to permit release of the driver.

9. A tool, as claimed in claim 1, wherein:

said tool body has a passage extending therethrough, the working piece being received within one end of the passage, whereby the passage permits the working piece to be removed from the passage.

10. An adaptor tool for connection to a driver, comprising:

a tool body;

a working piece connected to said tool body;

a lock member for locking said tool body to the driver;

a sliding member that is movable relative to said tool body to cause said lock member to move to permit the unlocking of the driver, said sliding member being positioned to facilitate grasping and moving thereof by a user of the adaptor tool, said sliding member including a cap member and a bushing member located inwardly of said cap member in which each of said cap member and said bushing member moves to permit the unlocking of said tool body from the driver; and a spring for engaging at least one of said sliding member, said tool body, and said lock member, wherein said spring permits the locking of said lock member when said sliding member is released by the user.

11. An adaptor tool for connection to a driver, comprising:

a tool body;

a working piece connected to said tool body;

a lock member for locking said tool body to the driver;

a sliding member to cause said lock member to move to permit the unlocking of the driver, wherein said tool body includes a driver passage for receiving the driver and said lock member engages means for restraining the movement of said lock member, wherein said restraining means causes alignment of said lock member passage with said driver passage; and at least a first spring for engaging at least one of said sliding member, tool body, and lock member, wherein said spring permits the locking of said lock member when said sliding member is released by a user.

12. A tool, as claimed in claim 11, wherein:

said first spring contacts said sliding member and said first spring alone has a sufficient tension to move said sliding member into at least one of a locked and unlocked position of said lock member.

13. A tool, as claimed in claim 12, further comprising:

a second spring for engaging said sliding member whereby said first spring returns said lock member to said locked position and said second spring returns said sliding member to said locked position.

14. An adaptor tool for connection to a driver, comprising:

a tool body;

a working piece connected to said tool body;

a lock member for locking said tool body to the driver;

a sliding member that is moveable relative to said tool body to cause said lock member to move to permit the unlocking of the driver, said sliding member having a front face and a back face, with said front face being relatively more adjacent to said working piece than said back face, wherein said lock member is located at a distance of no more than about 0.50 inch from said back face to engage said driver; and a spring for engaging at least one of said sliding member, tool body, and lock member, wherein said spring permits the locking of said lock member when said sliding member is released by a user.

15. A tool, as claimed in claim 16, wherein:

said tool body includes a passage to receive said driver, with an opening of said passage being located at a distance of no more than about 0.75 inch from said back face to engage said driver.

* * * * *